(12) United States Patent
Elliot et al.

(10) Patent No.: US 8,479,892 B2
(45) Date of Patent: Jul. 9, 2013

(54) AIRCRAFT BRAKING ACTUATOR

(75) Inventors: Nicholas Elliot, Winscombe (GB); Arnaud Didey, Portsmouth (GB)

(73) Assignee: Airbus Operations Limited, Bristol (GB)

( * ) Notice: Subject to any disclaimer, the term of this patent is extended or adjusted under 35 U.S.C. 154(b) by 153 days.

(21) Appl. No.: 13/012,012

(22) Filed: Jan. 24, 2011

(65) Prior Publication Data
US 2011/0180356 A1 Jul. 28, 2011

(30) Foreign Application Priority Data

Jan. 26, 2010 (GB) .................................. 1001176.5

(51) Int. Cl.
*F16D 55/08* (2006.01)
(52) U.S. Cl.
USPC ........................................................ 188/72.8
(58) Field of Classification Search
USPC ....................................... 188/71.5, 72.7, 72.8
See application file for complete search history.

(56) References Cited

U.S. PATENT DOCUMENTS

| | | | |
|---|---|---|---|
| 3,365,974 A * | 1/1968 | Lieberman ...................... | 74/425 |
| 4,542,809 A | 9/1985 | Crossman | |
| 4,567,967 A * | 2/1986 | Crossman ...................... | 188/72.8 |
| 5,107,967 A * | 4/1992 | Fujita et al. .................... | 188/72.8 |
| 6,581,730 B1 * | 6/2003 | Haydon et al. ................. | 188/71.5 |
| 6,978,868 B2 * | 12/2005 | Schautt ......................... | 188/72.7 |
| 2005/0056499 A1 * | 3/2005 | Narcy et al. ................... | 188/71.6 |
| 2006/0156845 A1 * | 7/2006 | Tong .............................. | 74/425 |

FOREIGN PATENT DOCUMENTS

EP 1857705 11/2007

OTHER PUBLICATIONS

UK Search Report for GB1001176.5 mailed May 18, 2010.

* cited by examiner

*Primary Examiner* — Thomas J Williams

(74) *Attorney, Agent, or Firm* — Lowe Hauptman Ham & Berner, LLP

(57) ABSTRACT

An aircraft wheel brake assembly has a housing for attachment to the landing gear of an aircraft, a friction plate in non-rotational sliding engagement with the housing, an actuated plate for non-rotational sliding engagement with an aircraft wheel, an aircraft brake actuator comprising, a first shaft for connection to a drive source, the first shaft defining a first axis, and, a second shaft for connection to, and actuation of, the brake assembly, the second shaft defining a second axis substantially perpendicular to the first axis, in which the first shaft and second shaft are connected in driving engagement by a ball-worm gear.

11 Claims, 7 Drawing Sheets

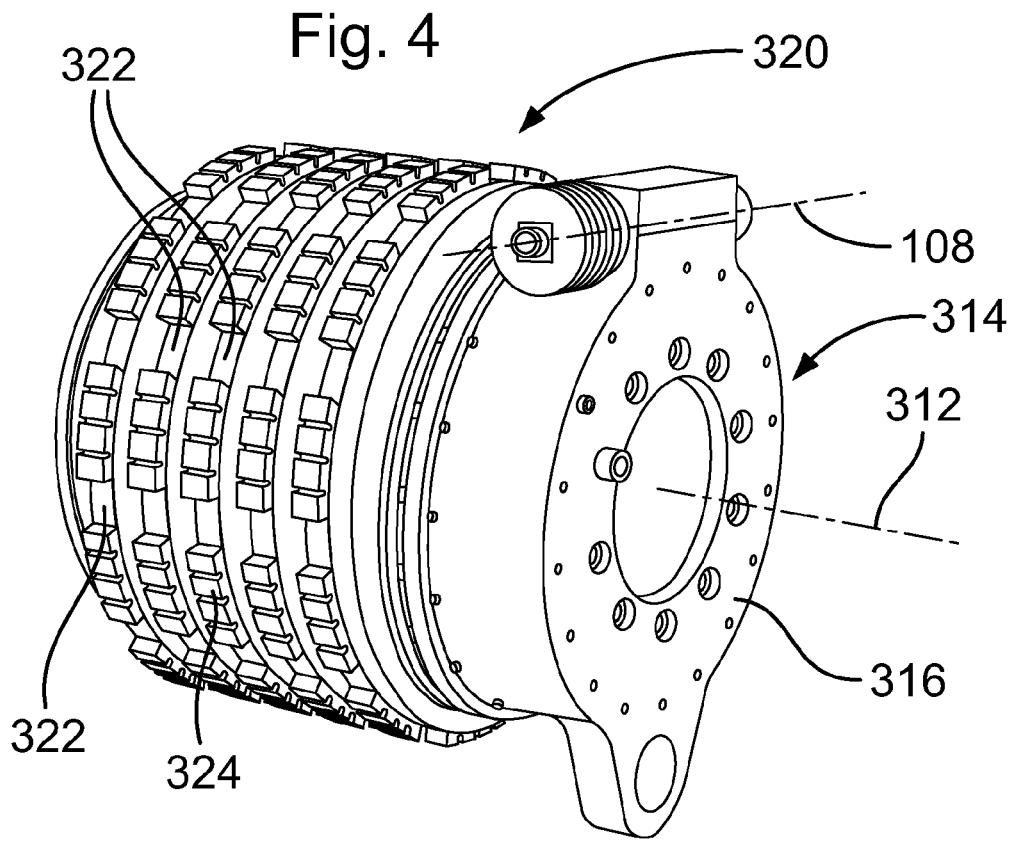
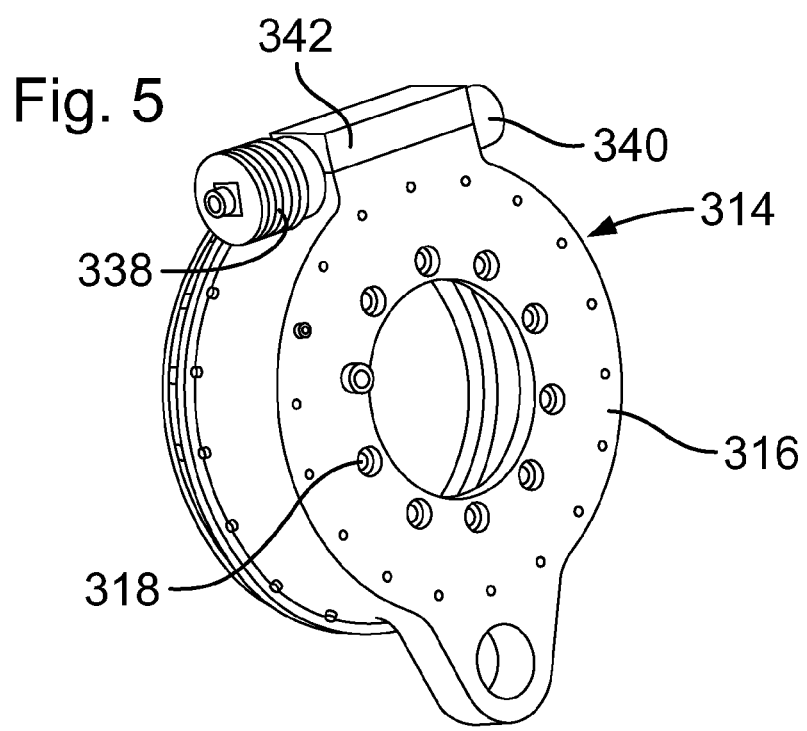

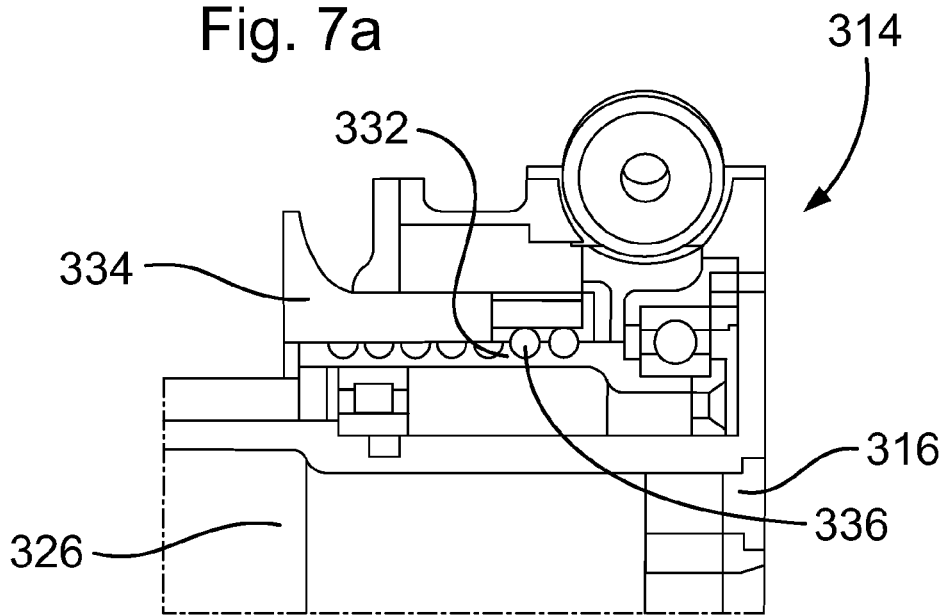
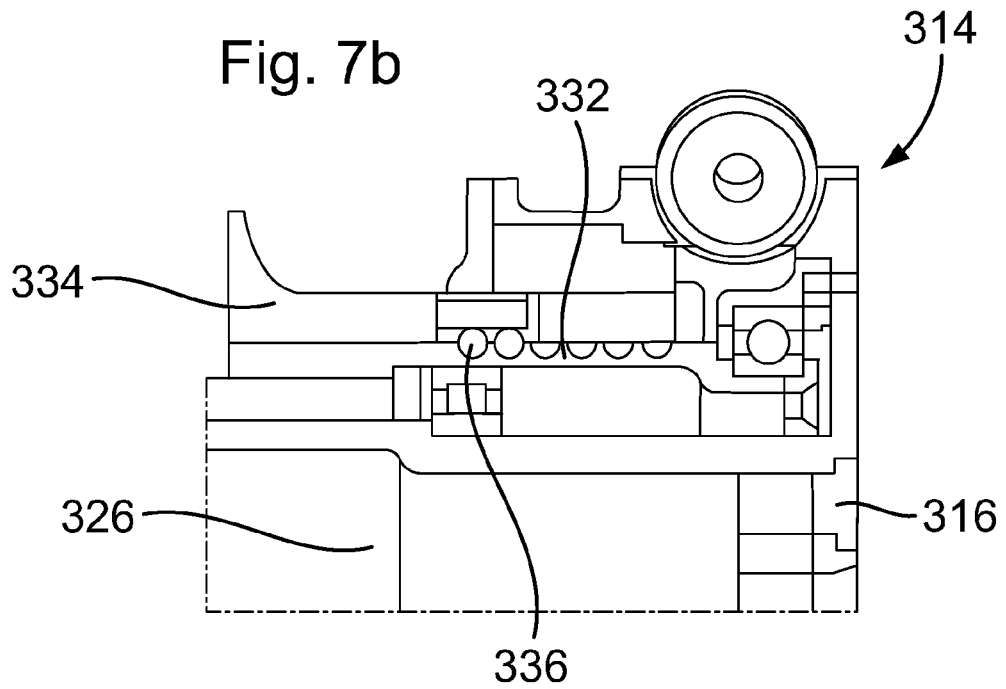

AIRCRAFT BRAKING ACTUATOR

RELATED APPLICATIONS

The present application is based on, and claims priority from, Great Britain Application Number 1001176.5, filed Jan. 26, 2010, the disclosure of which is hereby incorporated by reference herein in its entirety.

The present invention relates to an aircraft braking actuator. In particular, the present invention relates to an aircraft braking actuator comprising a ball-worm drive.

Aircraft landing gear wheels have braking systems to retard the speed of the aircraft upon landing and during taxiing. Such braking systems use a series of annular actuated plates which are keyed to the wheel rim and can be compressed between a series of friction plates, which are keyed to a stationary axle mounted to the landing gear. The friction plates and the actuated plates are "floating" such that an axial force applied to the endmost plate compresses the actuated and friction plates together such that the wheel speed is retarded. Both the actuated and friction plates have a friction material mounted thereon to increase the friction and the braking effect therebetween.

Due to the large diameter of passenger aircraft brakes, it is important that a circumferentially even force is applied to the end plate to avoid uneven loading or eccentricity of the arrangement. In known systems this is achieved with the use of a number of equally circumferentially spaced brake actuators, typically 4 or 5.

This is problematic as such a high number of actuators increases the weight of the aircraft through mounting and cabling equipment. The cost is also significant as typically a passenger aircraft may have 12 braked wheels, meaning that 48 to 60 actuators are required for each aircraft.

A requirement of such braking systems is that a large amount of force is required over a relatively short distance to apply the brake.

A problem with known arrangements is that they need to be driven back by the actuator to release the brake after it has been applied due to the large amounts of friction in the system.

It is an aim of the present invention to provide an improved aircraft braking actuator.

According to a first aspect of the invention there is provided an aircraft brake actuator comprising, a first shaft for connection to a drive source, the first shaft defining a first axis, and, a second shaft for connection to, and actuation of, a brake assembly of an aircraft landing gear, the second shaft defining a second axis transverse to the first axis, in which the first shaft and second shaft are connected in driving engagement by a ball-worm gear.

The use of a ball worm gear provides a relatively simple arrangement which is reliable, provides the desired gear reduction in a single stage and can be easily back driven, thus reducing and even obviating the need for the brake to be actuated to release it. In many cases, the system will spring back to an unapplied condition should the brake be released.

An example aircraft braking actuator in accordance with the present invention will now be described with reference to the accompanying drawings in which:

FIG. 1b is a part of the ball-worm assembly of FIG. 1a,

FIG. 1c is a further part of the ball-worm assembly of FIG. 1a,

Figure 2:
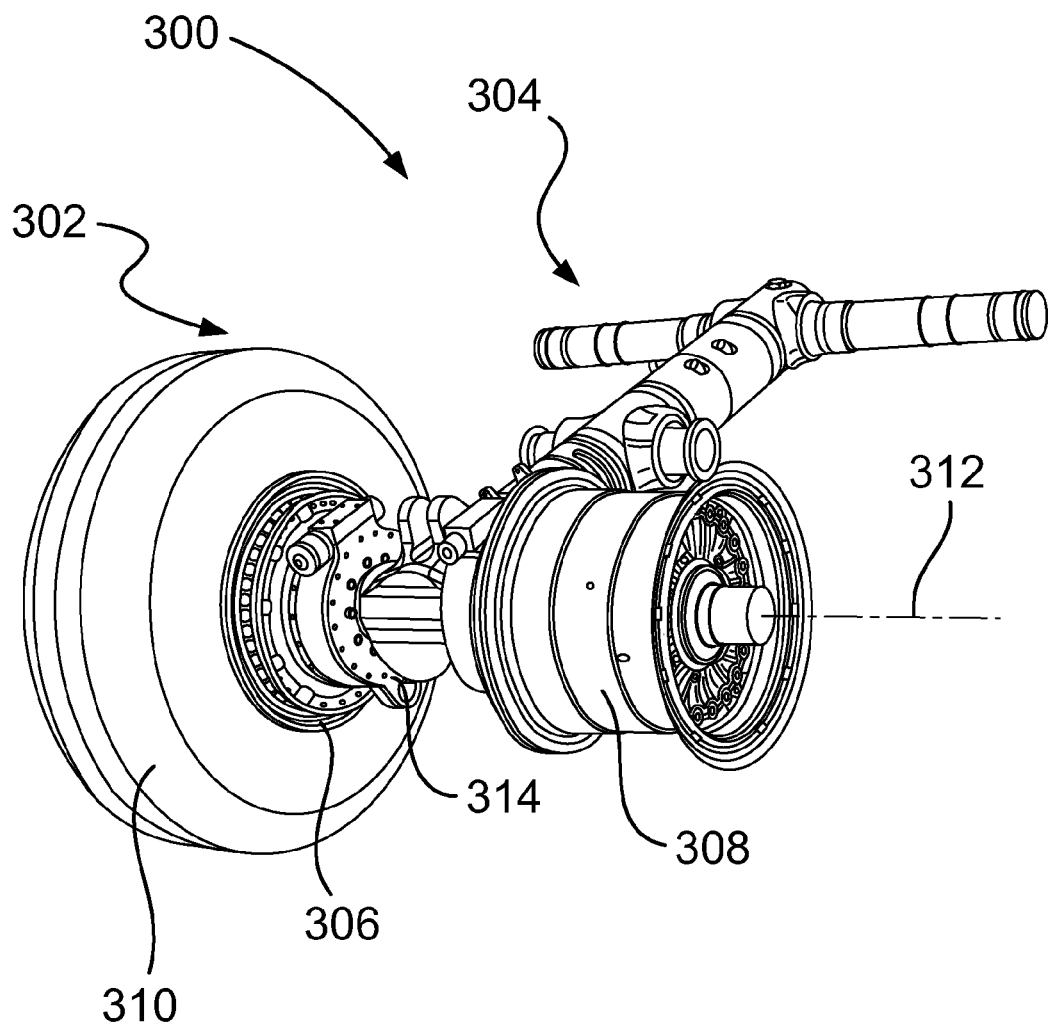
Figure 3:
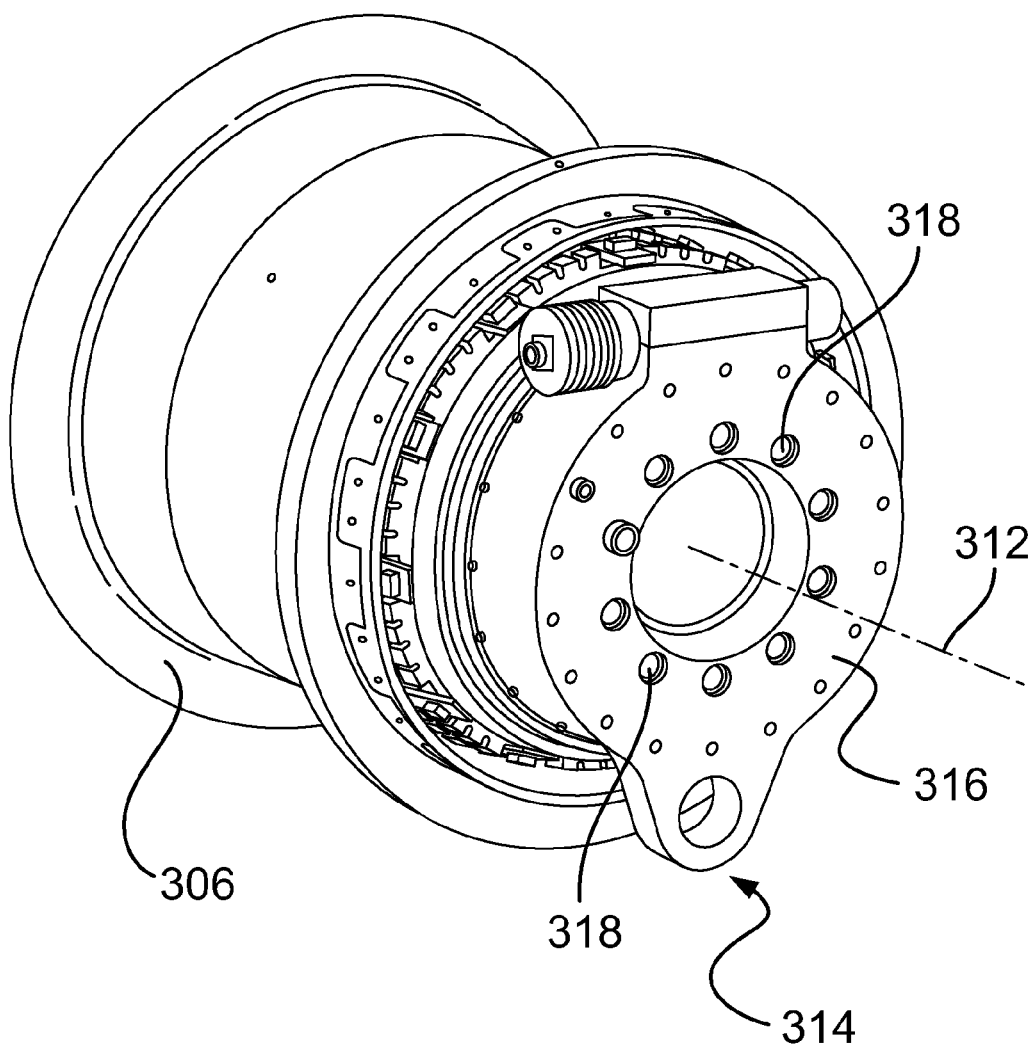
Figure 6:
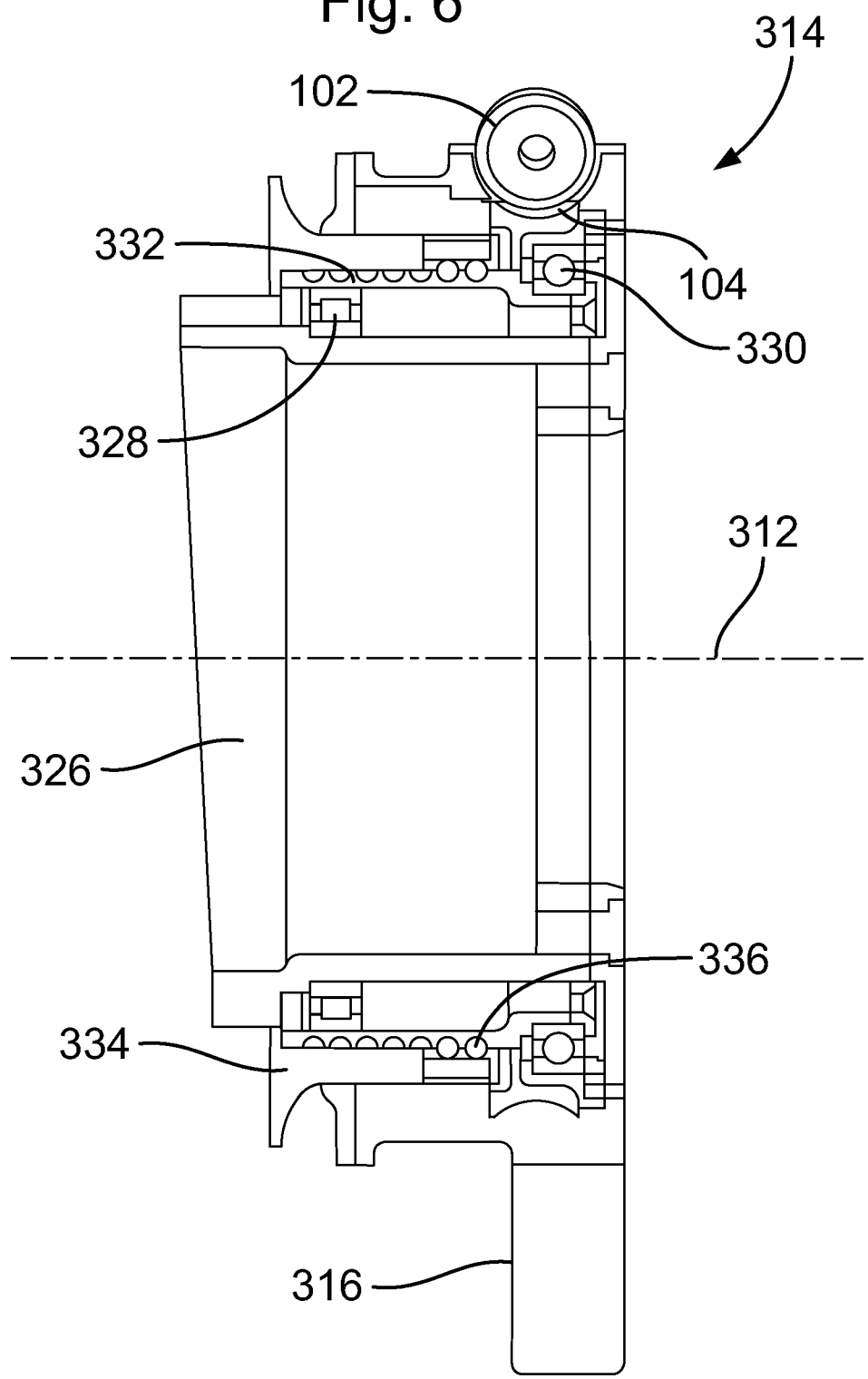

FIG. 2 is a perspective view of part of an aircraft landing gear assembly comprising a braking actuator in accordance with the present invention, FIG. 3 is a perspective view of a part of the landing gear assembly of FIG. 2, FIG. 4 is a perspective view of a part of the landing gear assembly of FIG. 2 without an aircraft wheel, FIG. 5 is a perspective view of the braking actuator of FIG. 2, FIG. 6 is a side section view of the braking actuator of FIG. 2, FIG. 7a is side section view of a part of the braking actuator of FIG. 2 in a retracted condition, and, FIG. 7b is a side section view of a part of the braking actuator of FIG. 2 in an extended condition.

Figure 1A:
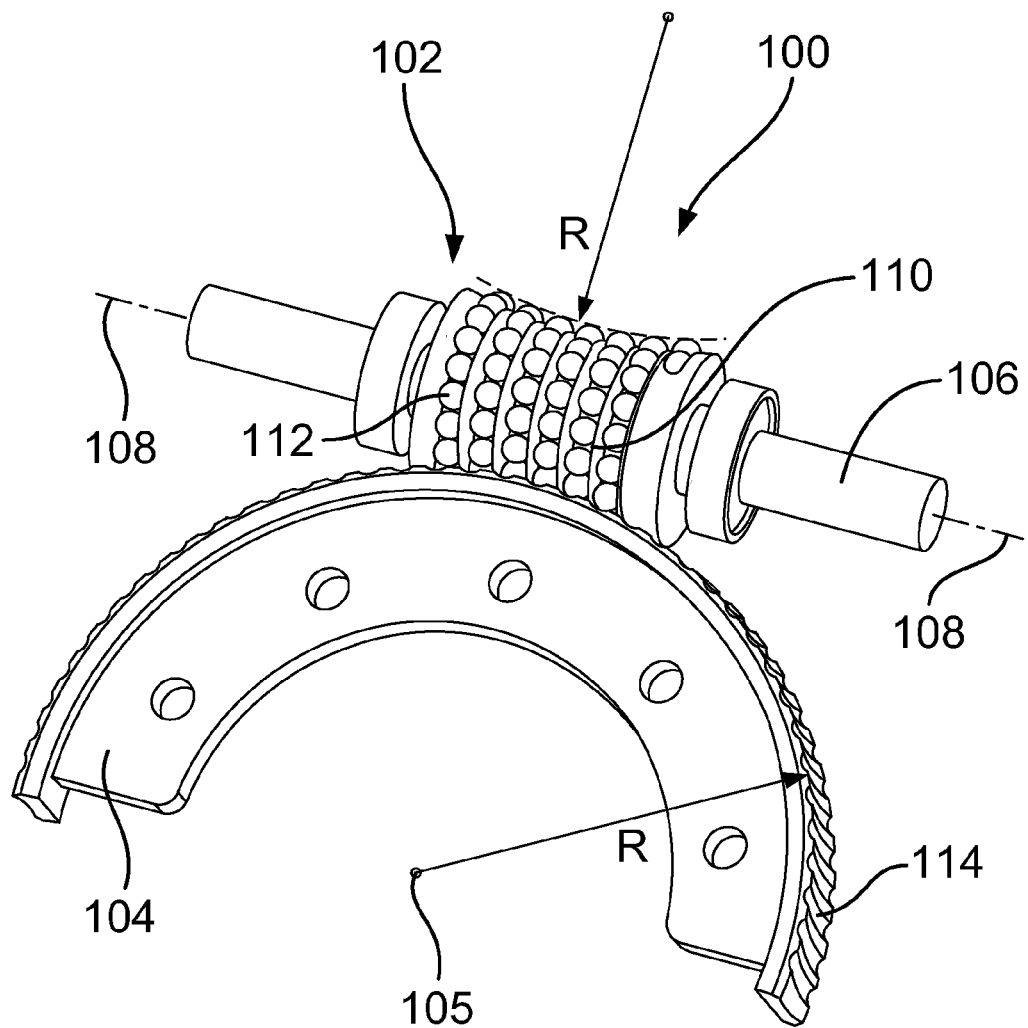
FIG. 1a is a perspective view of a ball-worm assembly.
Figure 1B:
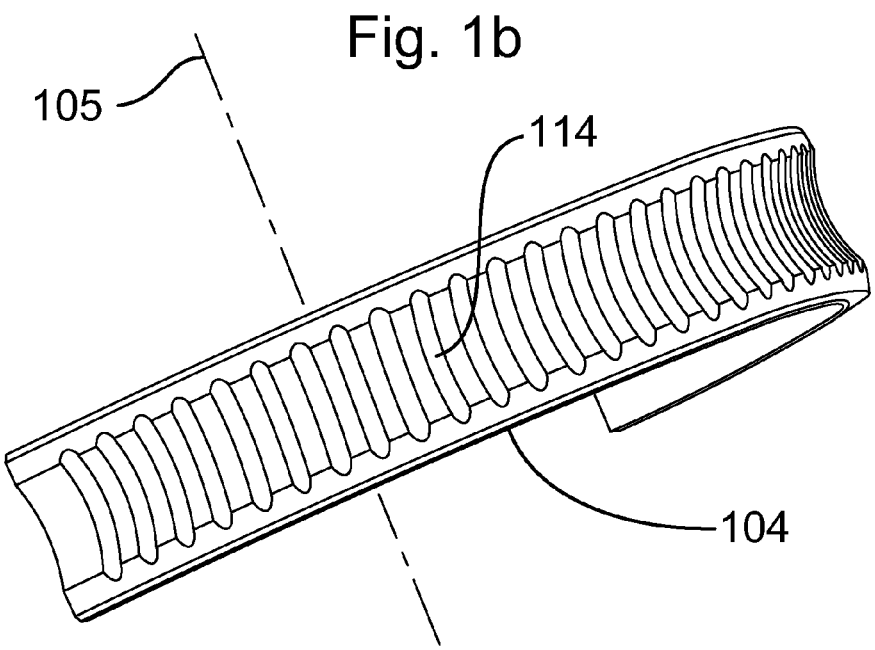
Figure 1C:
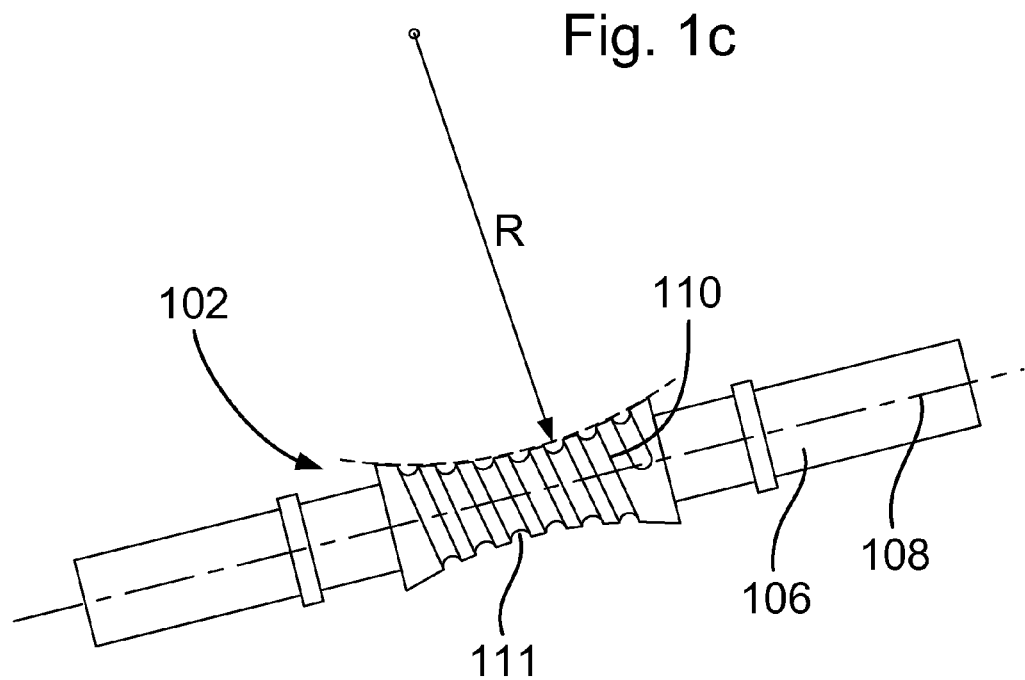

A ball-worm assembly 100 used in the present invention is shown in FIG. 1. The assembly comprises a driving shaft assembly 102 and a driven shaft 104. The driving shaft assembly 102 (also shown in FIG. 1c) comprises a driving shaft 106 defining a driving axis 108. A ball race 110 is attached to the driving shaft 106. The ball race is generally rotationally symmetric and defines a concave outer profile with radius R. A helical ball channel 111 surrounds the ball race 110 about the driving axis 108. A plurality of bearing balls 112 sit within the channel and are encased by a housing (not shown) so that they can move only along the path defined by the channel. The housing includes a recirculation system to provide the balls 112 with the ability to move along the channel in use.

The driven shaft 104 has an outer radius R and defines a driven axis 105. The driven shaft 104 defines a series of axial ball tracks 114 on its outer surface. When the race 110 and the driven shaft 114 are placed in close proximity, the channel and the tracks 114 define a path for the balls 112.

When the driving shaft is rotated, a circumferential force about driven axis 105 is applied to the axial ball tracks 114 of the driven shaft 104 by the balls 112 because they move in a helical path around the ball race 110. Torque is therefore transmitted through the race 110 to the balls 112 and consequently to the driven shaft 104. The ball-worm gear 100 provides a gear reduction from the driving shaft 106 to the driven shaft 104 and transfers the drive through 90 degrees from the axis 108 to the axis 105. Therefore a high speed, low torque input from the driving shaft 106 is geared to a low speed, high torque output at the driven shaft 104.

The ball-worm gear has the advantage that it is low friction compared to traditional worm gears (due to the moving ball bearings 112), and can be back driven, unlike other gear arrangements. Therefore the driven shaft 104 can act to drive the driving shaft 106 (e.g. when the brake is released).

An aircraft landing gear 300 is shown in FIG. 2. The landing gear 300 comprises a strut assembly 302 and a wheel assembly 304 connected on one end thereof. The strut assembly 302 is connected to an aircraft at the other end.

The wheel assembly 304 comprises a first wheel 306 and a second wheel 308. A tyre 310 is shown on the first wheel 306. The wheels 306, 308 are rotatable about a wheel axis 312. A brake actuator assembly 314 is mounted between the strut assembly 304 and the wheel 306 to provide a braking force as will be described below.

The wheel 306 and the brake actuator assembly 314 are shown in FIG. 3. The brake actuator assembly comprises an actuator housing 316. The actuator housing 316 is generally annular and mounted via a plurality of mounting bores 318 to be concentric about the axis 312.

Turning to FIG. 4, a brake assembly 320 is shown which sits concentrically within the wheel 306 (not shown). The brake assembly 320 comprises a plurality of friction plates 322 which are non-rotatably connected to a rotationally fixed torque tube (described below). The axle (not shown) is concentric with the axis 312, stationary and mounted to the strut assembly 302. The friction plates 322 are generally annular and coated on both sides with friction material.

The brake assembly comprises a plurality of actuated plates 324 interspaced between the friction plates. Each actuated plate 324 comprises a series of circumferentially spaced splines 324 which key the plates to the interior of the wheel 306.

Both the friction plates 322 and the actuated plates 324 are slidably movable along the axis 312 in use and therefore are "floating". It will be understood that when the assembly of the friction plates and actuated plates is compressed, a frictional force is generated between the stationary axle and the rotating wheel 306 to provide a braking force.

A side section view of the brake actuator assembly 314 is shown in FIG. 6. As can be seen, a torque tube 326 is non-rotationally fixed to the housing 316. The friction plates 322 (not shown) are keyed to the torque tube 326 and movable axially thereon.

The driven shaft 104 is rotationally mounted on the torque tube 326 and housing 316 via roller bearings 328, 330. The driven shaft comprises a threaded portion 332 extending over the torque tube 326. The threaded portion 332 comprises an external threaded formation. The driving shaft 102 is mounted in the housing 316 and engaged with the driven shaft 104 as described above with reference to FIG. 1a. Rotation of the driving shaft 102 about the driving axis 108 (see FIG. 4) therefore produces a rotation of the driven shaft 104 about the axis 312.

The brake actuator assembly 314 comprises a brake applicator 334 which surrounds the threaded portion 332 of the driven shaft 104. The brake applicator 334 comprises an internal threaded formation complementary to the external threaded formation of the threaded portion 332 of the driven shaft 104 is non-rotationally fixed but axially slidable along the axis 312. Balls 336 are disposed between the driven shaft 104 and the applicator 334 such that they form a ball screw joint, with the applicator acting as the ball nut. Therefore, rotation of the driven shaft 104 produced a linear motion of the applicator 334 along the axis 312.

The applicator 334 engages the endmost plate of the assembly of the friction and actuated plates 322, 324 to actuate the brake.

The brake actuator assembly 314 comprises a first motor 338 and a second motor 340 (see FIG. 5) which both act to apply a torque to the driving shaft 102 and consequently apply the brake as previously described.

As the friction material on the plates 322, 324 wears, the assembly gets progressively smaller in the direction of the axis 312. Therefore, the threaded portion 332 is provided a significantly longer length than required to actuate the brake to accommodate for gradual movement of the applicator 334 towards the plates 322, 324 during the life of the brake actuator assembly 314.

The brake actuator assembly 314 is shown in FIG. 7a in a retracted (i.e. new) condition. The brake actuator assembly 314 is shown in FIG. 7b in an extended (i.e. used) condition. In the used condition, the applicator 334 is extended towards the plates 322, 324 (not shown).

The driving shaft 102 and motors 338, 340 are accessible via a housing cover 342 (see FIG. 5) which can be removed. Therefore these components can be easily serviced and changed by removal of the cover 342 without jacking the aircraft and removing the entire assembly 314.

Variations of the above embodiment falling within the scope of the present invention are envisaged.

The applicator does not have to be moved axially via a ball screw connection, any connection to the second shaft 104 which converts rotational to axial motion may be used, for example a roller screw, although this would be less preferable.

The invention claimed is:

1. An aircraft wheel brake assembly comprising,
    a housing for attachment to the landing gear of an aircraft;
    a first plate rotationally engaged with the housing;
    a second plate rotationally engaged with an aircraft wheel, configured so as when the first and second plates are axially compressed together, a braking force is created between the housing and the aircraft wheel; and,
    an aircraft brake actuator comprising:
    a driving shaft for connection to a drive source, the driving shaft defining a first axis, and,
    a driven shaft
    defining a second axis transverse to the first axis, in which the driving shaft and driven shaft are connected in driving engagement by a ball-worm gear such that the driven shaft can back-drive the driving shaft; and
    a linear brake applicator for linear movement parallel to the second axis, the applicator arranged to move linearly in response to rotation of the driven shaft;
    wherein the linear brake applicator is arranged to axially compress the first and second plates together.

2. An aircraft wheel brake assembly according to claim 1 in which the first axis and the second axis are substantially perpendicular.

3. An aircraft wheel brake assembly according to claim 1 in which the ball-worm gear engages an outer surface of the driven shaft.

4. An aircraft wheel brake assembly according to claim 1, further comprising a screw gear between the driven shaft and the applicator arranged to transfer rotational motion of the driven shaft to linear motion of the applicator.

5. An aircraft wheel brake assembly according to claim 4 in which the screw gear is a ball-screw gear.

6. An aircraft wheel brake assembly according to claim 1, wherein:
    the first plate is a friction plate in non-rotational sliding engagement with the housing,
    the second plate is an actuated plate for non-rotational sliding engagement with the aircraft wheel.

7. An aircraft wheel brake assembly according to claim 6 having an aircraft wheel rotatable about a wheel axis, in which the driven shaft and applicator are coaxial with the wheel axis.

8. An aircraft wheel brake assembly according to claim 7 comprising a torque tube connected to the housing and extending at least partially into the wheel, the first plate being non-rotationally, slidably engaged with the torque tube.

9. An aircraft wheel brake assembly according to claim 1 comprising a first motor driveably connected to a first end of the driving shaft.

10. An aircraft wheel brake assembly according to claim 9 comprising a second motor driveably connected to a second end of the driving shaft.

11. An aircraft wheel brake assembly according to claim 9 in which the motor is mounted to the housing.

\* \* \* \* \*